Patented Sept. 5, 1933

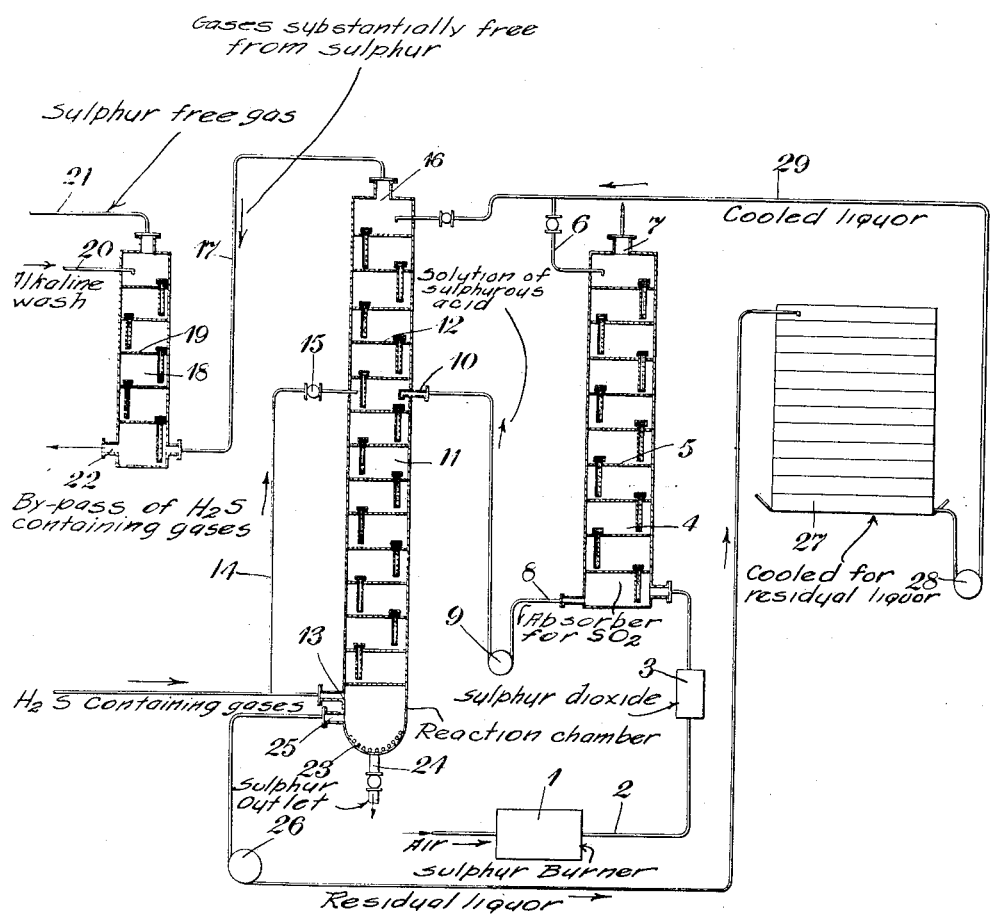

1,925,198

UNITED STATES PATENT OFFICE 1,925,198

REMOVAL OF HYDROGEN SULPHIDE FROM GASES

Francis Leopold Melvill, Pointe-a-Pierre, Trinidad, British West Indies, assignor to Trinidad Leaseholds, Limited, London, England Application December 7, 1931, Serial No. 579,548, and in Great Britain January 12, 1931

2 Claims. (Cl. 23—225)

This invention relates to the treatment of gases and vapours containing sulphur compounds, for instance, sulphur dioxide and hydrogen sulphide.

The invention relates more particularly to the treatment of distillation products of materials containing or yielding hydrocarbons, for instance, mineral oils, coal, shale and the like, for example, coal gas, the gases arising in the cracking of mineral oils, and to the treatment of casing head or natural gas.

It is well known that sulphur dioxide will react with hydrogen sulphide yielding elemental or free sulphur. If this reaction is caused to take place in the presence of water, free sulphur is obtained and, moreover, side reactions take place resulting in the formation of compounds of sulphur containing oxygen, for instance, polythionic acids and the like which are very soluble in water, and it is known that the polythionic acids formed may be subsequently converted into elemental sulphur by treatment with hydrogen sulphide, either in the form of hydrogen sulphide or in the form of a soluble sulphide.

The invention consists in a process for the removal of hydrogen sulphide from gases containing the same and particularly such gases obtained in the cracking of mineral oils which comprises dividing a stream of the gases into a main stream and a by-pass stream, causing the main stream of gases to flow in an upward direction under pressure greater than atmospheric pressure and at a temperature above the melting point of sulphur in contact with a descending current of a solution of sulphur dioxide, separating from the resulting aqueous liquor the molten sulphur arising from the reactions induced, introducing the by-pass stream of gas into the main stream of gas at a level above that at which contact between the main stream of gas and the said solution of sulphur dioxide terminates and causing the resulting mixture of gases to flow in counter-current with the residual aqueous liquor from which sulphur in a molten condition has been separated.

Thus, gas produced in the cracking of mineral oils may be treated in accordance with the invention.

Similarly the invention may be applied in the treatment of crude coal gas or other gas containing hydrogen sulphide or other volatile sulphides.

In the accompanying drawing an arrangement of plant for carrying the invention into effect is illustrated by way of example.

In the drawing, 1 represents a sulphur burner of known type in which, in the normal operation of the plant, sulphur which has been previously recovered by the process will be burnt. The sulphur dioxide is led therefrom by way of the pipe 2 to the cooler 3 and introduced into the bubble tower 4 provided with a plurality of bubbling trays 5 and in this tower the sulphur dioxide is brought into contact with water introduced by way of the pipe 6, nitrogen escaping by way of the outlet 7.

The solution of sulphur dioxide produced within the tower is withdrawn from the base thereof by the pipe 8 being delivered to the pump 9 which operates to deliver the solution by way of the pipe 10 to the bubble tower 11 which is provided with a plurality of bubbling trays 12. This tower is arranged to operate under a pressure substantially above atmospheric pressure if necessary and into the tower is introduced by way of the pipe 13 the hydrogen sulphide containing gas. The gas passes upwards through the tower in counter current to the solution of sulphur dioxide and the essential reactions take place between the point of introduction of the gas to the tower and the point at which the solution of sulphur dioxide is introduced. At this latter point and more or less adjacent thereto the tendency will be to form polythionic acids, which, in descending the tower, would be brought into intimate contact with gas containing increasing concentrations of hydrogen sulphide and thus facilitate the decomposition of these acids with the production of elemental sulphur. The gas passing upward beyond the point at which the solution of sulphur dioxide is introduced into the tower may contain a small proportion of sulphur dioxide as the result of the partial pressure of this product in the liquid at the point where the solution is introduced. In order to effect the removal of such sulphur dioxide from the gas the pipe 14 is provided and in this pipe a valve 15 is located. By this means a regulated proportion of sulphide containing gas is introduced, such proportion being generally regulated to correspond to the following equation:—

$$SO_2 + 2H_2S = 2H_2O + 3S.$$

the object being to ensure so far as possible that from the outlet 16 there will be delivered gas which is substantially free from both hydrogen sulphide and sulphur dioxide. In order, however, to prevent any possible loss of sulphur containing gas it is passed by way of the pipe 17 to the tower 18 which is provided with bubble trays 19 and into this tower there is introduced an alkaline solution by way of the pipe 20, a substantially sulphur-free gas leaving by way of the pipe 21, the liquor produced within the tower being delivered from the base thereof by way of the outlet 22.

It has been ascertained that the reaction between hydrogen sulphide and sulphur dioxide and between hydrogen sulphide and polythionic acids resulting in the production of elemental sulphur is promoted if pressure conditions above atmospheric pressure are maintained during the reaction and that, further, temperatures above atmospheric temperature are desirable.

Generally with increase in pressure and with increase in temperature the size of plant necessary for treating gas at a given rate necessarily will decrease but as will be understood beyond a certain limit the advantages arising from decrease in size of plant will be counterbalanced by the cost of pumping and the increase of cost of plant capable of withstanding pressure and temperature.

Suitable results have been secured with a pressure of eight atmospheres absolute and a plant temperature of about 40° C.

However, if it is desired to produce as a commercial product colloidal solutions of sulphur the carrying out of the process at temperatures materially above atmospheric temperature will normally be undesirable.

To ensure the maintenance of suitable temperature conditions with a view to promoting reaction and, further with a view to facilitating the removal of the sulphur by maintaining it in a molten condition in the base of the tower 11 while at the same time ensuring that the temperature at the point at which the solution of sulphur dioxide is introduced is such that excessive loss of sulphur dioxide therefrom will not arise, there is provided a steam coil 23 and an outlet 24 for the molten sulphur. In addition, there is provided an outlet 25 for the aqueous liquor separating from the sulphur. This liquor is of a more or less acidic character and it is delivered by the pump 26 to a cooling tower 27 of known construction, the cool liquor being arranged to be delivered by way of the pump 28 through the pipe 29 to the tower 11 the pipe 29 being arranged also to deliver a proportion thereof by way of the pipe 6 to the tower 4. Alternatively, this liquor may be run to waste or a proportion of this liquor may be withdrawn in either of which cases it may be necessary to supply fresh water or additional water to the towers 4 and 11.

The apparatus described above is particularly adapted for use in the treatment of gases obtained in the cracking or "topping" of mineral oils for instance petroleum and natural or casing head gas as such gases are available at a substantially high pressure thus rendering the provision of a compressor for introducing the gas into the tower 11 unnecessary.

As above pointed out, the tower 11 should be so constructed that suitable compression and temperature conditions may be maintained therein.

The rate of flow of water and sulphur dioxide solution is regulated so as to insure that the decomposition of the polythionic acids by the hydrogen sulphide is substantially complete, and if this is not the case and further recovery of sulphur from the liquid at the base of the tower is considered necessary, it can be achieved by accumulating this liquid in a suitable tank and subjecting it to the action of the gas over an increased period of time above what is obtainable under conditions here indicated.

In the treatment of crude coal gas or other gas containing hydrogen sulphide the procedure is almost identical with that outlined above but in this case it may be necessary or desirable to make provision for suitably raising the pressure of the gas supplied to the tower.

Further, as will be understood, in accordance with the invention, particularly in the case of coal gas, other means of removing sulphur from the gas or vapours may be combined with the above described method of separating and recovering sulphur. For instance, in treating coal gas after the greater portion of the sulphur has been removed by the action of sulphur dioxide in the presence of water, the gases may be subjected to further purifying treatment with the aid of, for instance, iron oxide.

While in the above detailed description reference has been made to the treatment of gases which contain hydrogen sulphide it is to be understood that the invention extends to the treatment of gases containing sulphur dioxide or other oxy compounds of sulphur for production of elemental sulphur. In such case the gases will first be treated with water to obtain a suitably concentrated solution of such sulphur compounds and the solution will be treated with hydrogen sulphide intentionally prepared or present in other available gases.

Further, it is to be understood that the invention is to be construed as covering not merely processes in which the production of elemental sulphur is the main purpose but also processes in which the production of elemental sulphur is incidental to the purification of gases.

Having now described my invention, what I claim as new and desire to secure by Letters Patent is:—

1. A process for the removal of hydrogen sulphide from gasses containing the same and particularly such gases obtained in the cracking of mineral oils which comprises dividing a stream of the gases into a main stream and a by-pass stream, causing the main stream of gases to flow in an upward direction under pressure greater than atmospheric pressure and at a temperature above the melting point of sulphur in contact with a descending current of a solution of sulphur dioxide, separating from the resulting aqueous liquor the molten sulphur arising from the reactions induced, introducing the by-pass stream of gas into the main stream of gas at a level above that at which contact between the main stream of gas and the said solution of sulphur dioxide terminates and causing the resulting mixture of gases to flow in counter-current with the residual aqueous liquor from which sulphur in a molten condition has been separated.

2. A process for the removal of hydrogen sulphide from gases containing the same and particularly such gases obtained in the cracking of mineral oils which comprises dividing a stream of the gasses into a main stream and a by-pass stream, causing the main stream of gasses to flow in an upward direction under pressure greater than atmospheric pressure and at a temperature above the melting point of sulphur in contact with a descending current of a solution of sulphur dioxide, separating from the resulting aqueous liquor the molten sulphur arising from the reactions induced, introducing the by-pass stream of gas into the main stream of gas at a level above that at which contact between the main stream of gas and the said solution of sulphur dioxide terminates and causing the resulting mixture of gases to flow in counter-current with a part of the residual aqueous liquor from which sulphur in a molten condition has been separated, causing a further part of the residual aqueous liquor to absorb sulphur dioxide and employing the resulting solution of sulphur dioxide to form the descending current thereof which is brought into contact with the main stream of gases containing hydrogen sulphide.

FRANCIS LEOPOLD MELVILL.